(12) United States Patent
Fujinaga et al.

(10) Patent No.: US 9,199,409 B2
(45) Date of Patent: Dec. 1, 2015

(54) STRETCHING APPARATUS AND METHOD OF MANUFACTURING POLYIMIDE FILM USING THE SAME

(75) Inventors: Takeru Fujinaga, Ube (JP); Yasuhiro Nagoshi, Ube (JP); Toshihito Sakai, Ube (JP); Hiroyuki Ikeuchi, Ube (JP)

(73) Assignee: UBE INDUSTRIES, LTD., Ube-shi, Yamaguchi (JP)

( * ) Notice: Subject to any disclaimer, the term of this patent is extended or adjusted under 35 U.S.C. 154(b) by 527 days.

(21) Appl. No.: 13/638,527

(22) PCT Filed: Mar. 29, 2011

(86) PCT No.: PCT/JP2011/057863
§ 371 (c)(1),
(2), (4) Date: Sep. 28, 2012

(87) PCT Pub. No.: WO2011/125662
PCT Pub. Date: Oct. 13, 2011

(65) Prior Publication Data
US 2013/0037988 A1     Feb. 14, 2013

(30) Foreign Application Priority Data

Mar. 31, 2010   (JP) .................. 2010-081321
Mar. 31, 2010   (JP) .................. 2010-081384

(51) Int. Cl.
*B29C 55/06* (2006.01)
*B29C 55/14* (2006.01)
(Continued)

(52) U.S. Cl.
CPC .............. *B29C 55/06* (2013.01); *B29C 55/08* (2013.01); *B29C 55/14* (2013.01); *B29C 55/20* (2013.01);
(Continued)

(58) Field of Classification Search
CPC ........ B29C 55/02; B29C 55/04; B29C 55/06; B29C 55/18
See application file for complete search history.

(56) References Cited

U.S. PATENT DOCUMENTS 5,324,475 A   6/1994   Okahashi
5,460,890 A   10/1995  Okahashi
(Continued)

FOREIGN PATENT DOCUMENTS

CN   1914025 A        2/2007
JP   S62-268629 A1   11/1987
(Continued)

OTHER PUBLICATIONS

A Notification of First Office Action with Search Report issued by the State Intellectual Property Office of China, mailed May 5, 2014, for Chinese counterpart application No. 201180026573.6.
(Continued)

*Primary Examiner* — Galen Hauth
(74) *Attorney, Agent, or Firm* — Law Office of Katsuhiro Arai

(57) ABSTRACT

A stretching apparatus capable of optimally inhibiting neck-in of a film when the film is stretched in an MD (Machine Direction), has an advancing mechanism, a take-in mechanism, and film-holding unit placed at both end portions in a TD (Transverse Direction) of a transfer path of film between the mechanisms. The film-holding unit has a plurality of upper holding rollers placed in parallel at intervals in the MD of the film above the transfer path of film, and a plurality of lower holding rollers placed opposite to upper holding rollers below the transfer path of film such that the plurality of lower holding rollers work together with the plurality of upper holding rollers to sandwich the film vertically between the rollers. Upper holding rollers and lower holding rollers are rotatably supported such that their rotational axes are inclined outward in the TD of film toward a downstream side of the MD of film.

12 Claims, 6 Drawing Sheets

(51) Int. Cl.
  *B29C 55/20* (2006.01)
  *B65H 23/025* (2006.01)
  *C08J 5/18* (2006.01)
  *B29C 55/08* (2006.01)
  *B29K 79/00* (2006.01)

(52) U.S. Cl.
  CPC ............. *B65H 23/025* (2013.01); *C08J 5/18* (2013.01); *B29K 2079/00* (2013.01); *B29K 2079/08* (2013.01); *B65H 2301/512422* (2013.01); *B65H 2701/175* (2013.01); *C08J 2379/08* (2013.01)

(56) References Cited

U.S. PATENT DOCUMENTS

| | | | | |
|---|---|---|---|---|
| 6,051,177 | A * | 4/2000 | Ward | 264/288.8 |
| 2005/0012239 | A1 * | 1/2005 | Nakashima | 264/216 |
| 2007/0157436 | A1 * | 7/2007 | Busch et al. | 19/163 |

FOREIGN PATENT DOCUMENTS

| | | |
|---|---|---|
| JP | S63-001665 A1 | 1/1988 |
| JP | H04-223135 A | 8/1992 |
| JP | 2001-316006 A | 11/2001 |
| JP | 2003-123942 A | 4/2003 |
| JP | 2004-002880 A | 1/2004 |
| JP | 2005-067000 A1 | 3/2005 |
| JP | 2009-203055 A1 | 9/2009 |

OTHER PUBLICATIONS

The International Preliminary Report on Patentability, issued by the International Bureau of WIPO, mailed May 31, 2011, for International Application No. PCT/JP2011/057863.

* cited by examiner

STRETCHING APPARATUS AND METHOD OF MANUFACTURING POLYIMIDE FILM USING THE SAME This application is the U.S. National Phase under 35 U.S.C. §371 of International Application PCT/JP2011/057863, filed Mar. 29, 2011, which claims priority to Japanese Patent Application No. 2010-081321, filed Mar. 31, 2010, and Japanese Patent Application No. 2010-081384, filed Mar. 31, 2010. The International Application was published under PCT Article 21(2) in a language other than English.

TECHNICAL FIELD

The present invention relates to a stretching apparatus used for stretching a film in a Machine Direction during a film manufacture process. The present invention also relates to a method of manufacturing a polyimide film including a step of stretching with the stretching apparatus.

BACKGROUND ART

In a film manufacture method, sequential biaxial stretching is performed which includes stretching a film under manufacture in a Machine Direction (MD) and then stretching the film in a Transverse Direction (TD). The stretching of the film can reduce the coefficient of thermal expansion of the film in the stretching directions.

An example of the film is a polyimide film. Since the polyimide film has various excellent properties such as light weight, flexibility, film strength, and heat resistance, the film is used in a variety of fields, especially in electronics and electrical fields, as the material of a flexible wiring board, the material of a COF substrate, and the like.

In a known method of manufacturing the polyimide film through the stretching, a solution containing a polyimide precursor such as polyamic acid in a solvent is cast onto a support to provide a self-supporting film (also referred to as a gel-like film, a gel film or the like), the self-supporting film is peeled from the support, then the film is pulled in the MD to perform the stretching by taking advantage of a difference in circumferential velocity between two rollers placed at an interval in the MD direction approximately at a heating temperature at which imidization does not proceed, and the self-supporting film stretched in the MD is then stretched in the TD and heated with both ends held by a tenter apparatus or the like (this method is also referred to as thermal cure).

Patent Document 1 has disclosed a polyimide film produced by casting a solution of polyamide acid containing a ring closure catalyst and a dehydrating agent in an organic solvent onto the surface of a support, imidizing the polyamide acid to form a continuous gel film having a self-supporting property and a solid content of 5 to 50 wt %, stretching the gel film in a traveling direction by 1.1 to 1.9 times, and stretching the film in the TD by 0.9 to 1.3 times the stretching factor in the traveling direction.

A conventionally known method of stretching the film in the MD includes pulling the film in the MD to perform the stretching by taking advantage of a difference in circumferential velocity between two rollers placed at an interval in the MD of the film. In the conventional stretching, however, a so-called neck-in phenomenon occurs in which the film is shrunk in the TD during the stretching in the MD.

When the neck-in occurs, the stretching of the film in the TD at the next step requires not only stretching of the shrunk amount of the film but also stretching of a desired stretching amount in the TD, which results in the need to increase the total stretching amount. The increased stretching amount easily causes a film break to reduce the efficiency of manufacture of the film. The increased stretching amount also adds the mechanical load to a stretching apparatus. In addition, the occurrence of the neck-in may lead to nonuniform film properties in the TD.

To address them, Patent Document 2 has disclosed a stretching apparatus which includes a unique heater apparatus having an improved heat amount applied per unit area to supply the heat amount necessary for stretching to a film in a short transfer distance, so that the neck-in amount can be reduced.

PRIOR ART REFERENCES

Patent Documents

Patent Document 1: Japanese Patent Laid-Open No. 2004-2880
Patent Document 2: Japanese Patent Laid-Open No. 2003-123942

SUMMARY OF THE INVENTION

Problems to be Solved by the Invention

As described above, the stretching apparatus disclosed in Patent Document 2 is characterized by the heater apparatus and requires the heating of the film. However, the stretching of the film may not require the heating, and in this case, the neck-in can not be reduced.

It is an object of the present invention to provide a stretching apparatus capable of favorably suppressing the neck-in even when heating is not required.

It is another object of the present invention to provide a method of manufacturing a polyimide film which involves the use of a stretching apparatus suitable for stretching a polyimide self-supporting film in the MD to suppress the neck-in and facilitates stretching in the TD, thereby efficiently manufacturing the polyimide film.

Means for Solving the Problems

The present invention provides a stretching apparatus including an advancing mechanism for advancing a film, a take-in mechanism for taking in the film advanced from the advancing mechanism at a speed higher than a speed of the film advanced from the advancing mechanism, and two sets of film holding units placed at both end portions in a TD (Transverse Direction) of the film between the advancing mechanism and the take-in mechanism. Each of the film holding units has a plurality of upper holding rollers placed in parallel at intervals in an MD (Machine Direction) of the film above a transfer path of the film, and a plurality of lower holding rollers placed opposite to the upper holding rollers below the transfer path of the film such that the plurality of lower holding rollers work together with the plurality of upper holding rollers to place the film sandwiched vertically between the rollers. The upper holding rollers and the lower holding rollers are rotatably supported such that their rotational axes are inclined outward in the TD of the film toward a downstream side of the MD of the film.

The stretching apparatus according to the present invention can further include an upper plate supporting the plurality of upper holding rollers and a lower plate placed in opposite to the upper plate to support the plurality of lower holding rollers. In this case, at least one of the upper plate and the lower plate is preferably supported to be movable vertically. More preferably, at least ones of the plurality of upper holding rollers and the plurality of lower holding rollers are supported to be elastically and vertically displaceable individually with a plurality of elastic members interposed.

A heating furnace heating the film during transfer may be included between the advancing mechanism and the take-in mechanism. In this case, at least part of the film holding unit is preferably placed within the heating furnace. The heating furnace may have an inlet-side opening and an outlet-side opening for the film, and some of the plurality of upper holding rollers and some of the lower holding rollers may be placed outside the heating furnace through the inlet-side opening and the outlet-side opening.

The heating furnace may heat the film with hot air.

Each of the upper holding rollers and the lower holding rollers preferably has a circumferential surface subjected to rough-surface treatment in order to suppress the neck-in more favorably.

Each of the advancing mechanism and the take-in mechanism is preferably formed of a roller in terms of practicality. In addition, at least one of the advancing mechanism and the take-in mechanism is preferably a suction roller.

The present invention provides a method of manufacturing a polyimide film including:

a first step of casting a solution containing a polyimide precursor in a solvent onto a support to provide a self-supporting film; and a second step of heating the self-supporting film during transfer, the second step including stretching the self-supporting film in an MD (Machine Direction) with a stretching apparatus, wherein the stretching apparatus is the stretching apparatus according to the present invention described above, and the self-supporting film is stretched as a film.

In the method of manufacturing the polyimide film according to the present invention, the second step preferably includes stretching the self-supporting film in a TD (Transverse Direction) after the stretching of the self-supporting film in the MD with the stretching apparatus. In this case, the advantages of the present invention can be achieved more effectively.

Effects of the Invention

Since the stretching apparatus according to the present invention performs the stretching while the film holding unit holds both end portions in the TD of the film, the film can be stretched favorably with suppressed neck-in even when heating of the film is not required. Especially, in manufacturing the sequentially biaxially stretched film stretched in the TD after the stretching in the MD, extra stretching in the TD is not needed due to the suppressed neck-in, so that it is possible to suppress film breaks during the stretching in the TD and to reduce the mechanical load on the stretching apparatus. In addition, the stretched film having a desired coefficient of thermal expansion can be obtained.

According to the method of manufacturing the polyimide film, in the stretching of the self-supporting film in the MD with the stretching apparatus of the present invention, the self-supporting film can be stretched in the MD while the neck-in is suppressed regardless of heating conditions. As a result, the polyimide film can be manufactured more efficiently. Especially, when the second step includes the stretching in the TD after the stretching with the stretching apparatus described above, the neck-in is suppressed and thus extra stretching in the TD is not required. This can suppress film breaks during the stretching in the TD and can manufacture the polyimide film having a desired coefficient of thermal expansion more efficiently.

EMBODIMENTS FOR CARRYING OUT THE INVENTION

Figure 1:
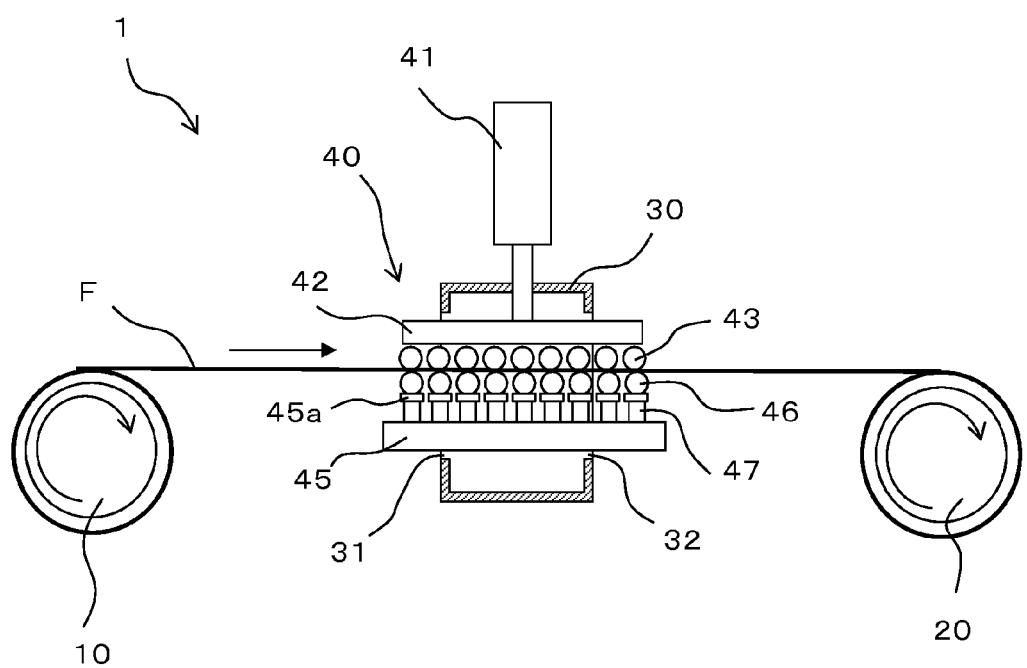
FIG. 1 A schematic side view of a stretching apparatus according to an embodiment of the present invention.

Referring to FIG. 1, stretching apparatus 1 according to an embodiment of the present invention is shown which is used for stretching film F in a Machine Direction in a process of manufacturing film F.

Stretching apparatus 1 has feed roller 10 serving as an advancing mechanism for advancing film F and take-up roller 20 serving as a take-in mechanism for taking in film F at a speed higher than a speed of film F advanced by the advancing mechanism. Feed roller 10 and take-up roller 20 are individually driven to rotate by driving mechanisms, not shown, such that film F is transferred from feed roller 10 to take-up roller 20. Take-up roller 20 has a circumferential velocity higher than that of feed roller 10. Since the difference in circumferential velocity between them causes film F to be pulled between feed roller 10 and take-up roller 20, film F is stretched in the MD. The ratio of the circumferential velocity between feed roller 10 and take-up roller 20 can be set as appropriate to adjust the stretching rate of film F.

An arbitrary roller used typically in the stretching apparatus of this type can be used as each of feed roller 10 and take-up roller 20. It is important to prevent a slip of film F on the roller surface in order to stretch the film at a desired stretching rate. To prevent a slip of film F, at least one of feed roller 10 and take-up roller 20 can be provided by using a suction roller having a plurality of suction holes in the surface to suck film F with a negative pressure. Each of the advancing mechanism and the take-in mechanism may be formed of a group of rollers consisting of a plurality of rollers. In this case, at least one of the rollers can also be provided by using the suction roller.

Heating furnace 30 for heating film F during the transfer is installed between feed roller 10 and take-up roller 20. Heating furnace 30 has inlet-side opening 31 and outlet-side opening 32. Film F is heated by a heat source, not shown, in the course from the point where film F enters heating furnace 30 through inlet-side opening 31 to the point where film F exits from heating furnace 30 through outlet-side opening 32, and the heated portion of film F is preferentially stretched.

Figure 2:
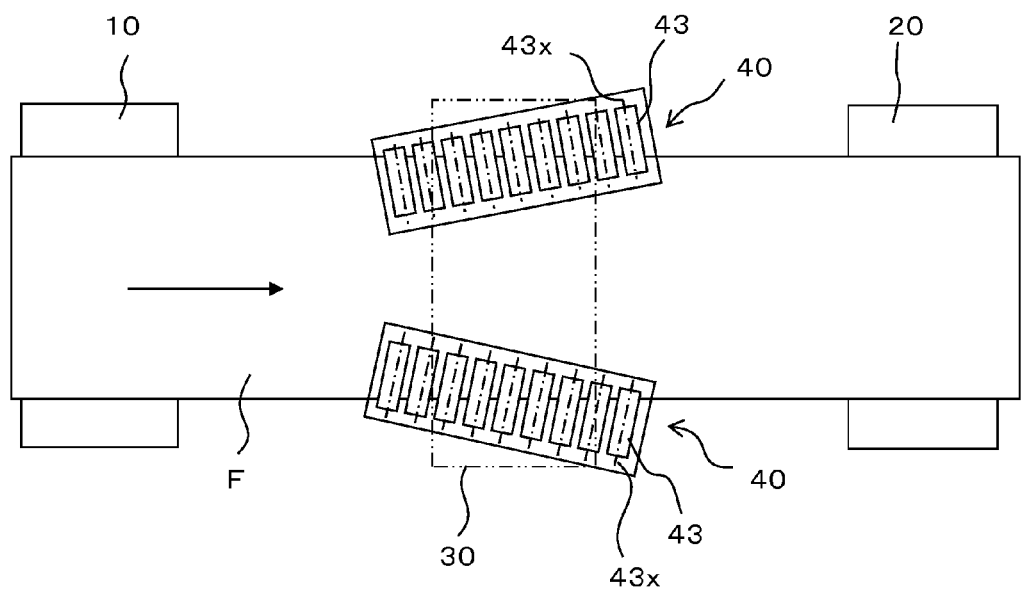
FIG. 2 A schematic diagram showing the placement of film holding units when the stretching apparatus shown in FIG. 1 is viewed from above.

Two film holding units 40 are placed at both end portions in the TD of film F within heating furnace 30 as shown in FIG. 2.

Each of film holding units 40 has upper plate 42 and lower plate 45 placed vertically opposite to each other such that the transfer path of film F from feed roller 10 to take-up roller 20 is interposed between them.

Upper plate 42 is supported by linear actuator 41 such as an air cylinder, a hydraulic cylinder, or an electrically powered cylinder to be movable in the vertical direction in which upper plate 42 is opposite to lower plate 45, and rotatably supports a plurality of upper holding rollers 43 on a lower surface side. As shown in FIG. 2, the plurality of upper holding rollers 43 are placed in parallel at intervals in the MD (direction indicated by an arrow) of film F, and are supported such that rotational axis 43x is inclined outward from film F toward downstream of the MD of film F relative to the TD of film F. This causes the outer circumferential surfaces of upper holding rollers 43 to face diagonally outward in the TD of film F when viewed from downstream of the MD of film F.

While upper holding rollers 43 preferably have the same length, diameter, intervals, and inclination relative to the TD of film F, at least one of the length, diameter, intervals, and inclination may be different among them.

Lower plate 45 individually supports a plurality of lower holding rollers 46 with a plurality of springs 47 and a plurality of sub-plates 45a interposed between them on an upper surface side. Spring 47 is fixed at its lower end to lower plate 45 and can be elastically deformed in response to a force acting from upper plate 42 toward lower plate 45. For example, a compression coil spring can be used as spring 47. Each of sub-plates 45a is fixed to the upper end of each of springs 47 and rotatably supports each of lower holding rollers 46. Thus, the plurality of lower holding rollers 46 are supported to be elastically and vertically displaceable individually with the plurality of springs 47 interposed.

The plurality of lower holding rollers 46 supported in this manner are placed below the transfer path of film F. Each of lower holding rollers 46 is placed at the position opposite vertically to associated upper holding roller 43 such that roller 46 and associated upper holding roller 43 can work together to put film F sandwiched vertically between them. Thus, similarly to upper holding rollers 43, lower holding rollers 46 are also placed in parallel at intervals in the MD of film F and the outer circumferential surfaces thereof face diagonally outward in the TD of film F when viewed from downstream of the MD of film F. Lower holding rollers 46 may have different or the same length, diameter, intervals, and inclination as long as each of rollers 46 has the same length, diameter, intervals, and inclination as that of opposite upper holding roller 43. The force (pressurizing force) with which film F is sandwiched between upper holding roller 43 and lower holding roller 46 can be adjusted by appropriately setting the vertical position of upper holding roller 43 with linear actuator 41.

Film holding unit 40 is placed within heating furnace 30 as described above. In the present embodiment, however, the entire film holding unit 40 is not placed within heating furnace 30 but part of film holding unit 40 protrudes from inlet-side opening 31 and outlet-side opening 32 upstream and downstream in the MD of film F. This causes some of upper holding rollers 43 and some of lower holding rollers 35 to protrude from inlet-side opening 31 and outlet-side opening 32 upstream and downstream in the MD of film F.

According to stretching apparatus 1 of the present embodiment formed as described above, film F advanced from feed roller 10 is heated by heating furnace 30 on the transfer path before film F is taken up on take-up roller 20, and is stretched in the heating area. In the area where film F is stretched, both end portions of in the TD of film F are sandwiched vertically between the plurality of upper holding rollers 43 and the plurality of lower holding rollers 46 of film holding unit 40. Since upper holding rollers 43 and lower holding rollers 46 are rotatably supported, upper holding rollers 43 and lower holding rollers 46 are rotated by friction with film F when film F is transferred from feed roller 10 toward take-up roller 20 between rollers 43 and 46.

Since upper holding rollers 43 and lower holding rollers 46 are supported with their rotational axes facing diagonally outward in the TD of film F toward downstream of the MD of film F, the rotation of upper holding rollers 43 and lower holding rollers 46 causes an outward force in the TD of film F to act on both end portions in the TD of film F by the friction with upper holding rollers 43 and lower holding rollers 46. This force effects to restrain film F against the reduction of the width of film F due to the stretching, and as a result, neck-in of film F is suppressed. Since both end portions of in the TD film F are mechanically restrained by upper holding rollers 43 and lower holding rollers 46 in this manner in the present embodiment, the neck-in can be suppressed regardless of heating conditions. In addition, the rotation of upper holding rollers 43 and lower holding rollers 46 follows the transfer of film F, and the force to restrain film F with upper holding rollers 43 and lower holding rollers 46 is small in the MD of film F, so that little influence is exerted on the stretching of film F.

Since the plurality of upper holding rollers 43 and the plurality of lower holding rollers 46 are placed at intervals in the MD of film F, the area where the neck-in of film F may occur can be sandwiched over the wide range in the MD of film F. As a result, the neck-in of film F can be effectively suppressed.

Figure 3:
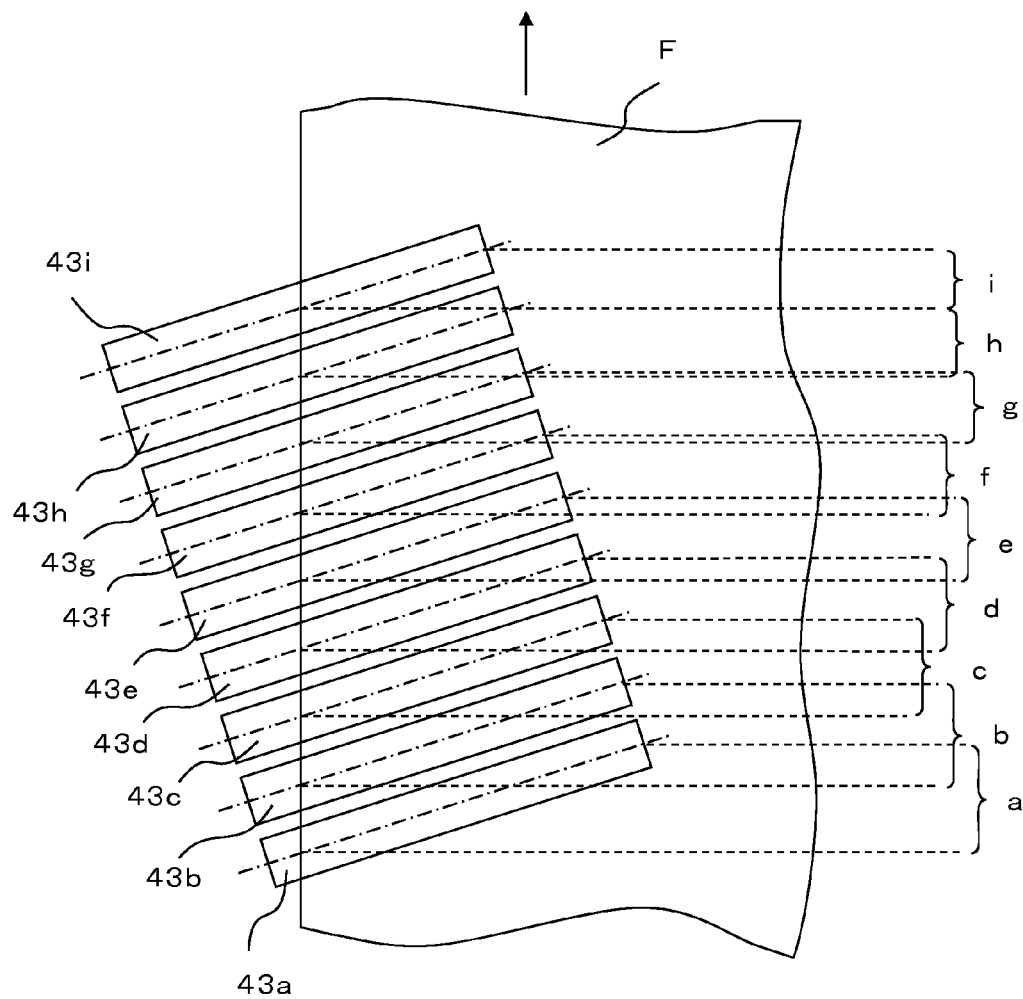
FIG. 3 A diagram showing the preferable placement of a plurality of upper holding rollers.

To achieve the advantage more effectively, for example assuming that upper holding rollers 43a to 43i are provided as shown in FIG. 3, when areas a to i held by the upper holding rollers 43a to 43i in the MD of the film F are considered, the lengths, intervals and inclination angles of the rotational axes relative to the TD of film F of upper holding rollers 43a to 43i are preferably set such that two adjacent areas in the MD of film F (a and b, b and c, c and d, d and e, e and f, f and g, g and h, h and i) are in contact with each other or overlap each other. It goes without saying that as many lower holding rollers (not shown in FIG. 3) as upper holding rollers 43a to 43i are provided in association and the lower holding rollers are placed in opposite to associated upper holding rollers 43a to 43i.

The placement of the plurality of upper holding rollers 43a to 43i and the plurality of lower holding rollers allows film F to be sandwiched between any one of the pairs of the upper holding rollers and the lower holding rollers over area a to area i in the MD of film F. This can suppress the neck-in more effectively.

Since film F is sandwiched between the plurality of upper holding rollers 43 and the plurality of lower holding rollers 46 in the present embodiment, it is important to sandwich film F between all the pairs of upper holding rollers 43 and lower holding rollers 46 in order to suppress the neck-in effectively. Specifically, it is important to mount upper holding rollers 43 such that the distances in a direction perpendicular to the lower surface of upper plate 42 are equal to each other and to mount lower holding rollers 46 such that the distances in a direction perpendicular to the upper surface of lower plate 45 are equal to each other.

Figure 4:
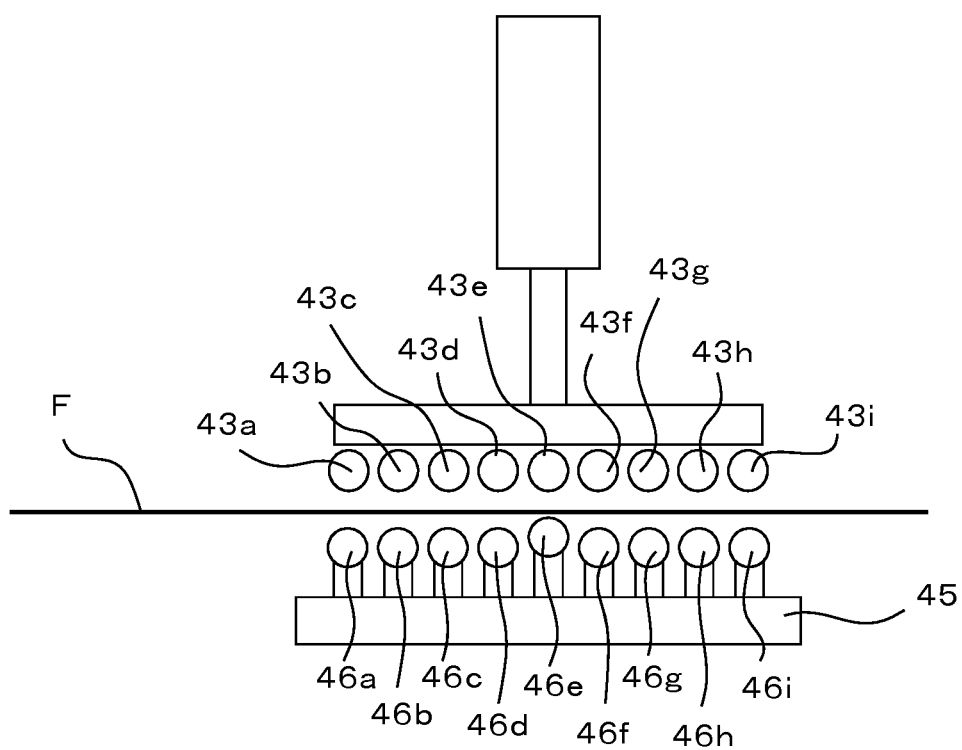
FIG. 4 A schematic side view of the film holding unit when a holding roller is mounted at a displaced position.

In reality, however, variations or the like in the mounting of upper holding rollers 43 and lower holding rollers 46 to upper plate 42 and lower plate 45, respectively, may cause one lower holding roller 46e to be mounted at a position protruding from the other lower holding rollers 46a to 46d and 46f to 46i relative to the upper surface of lower plate 45 as shown in FIG. 4, by way of example. In this case, film F is sandwiched only between upper holding roller 46e and opposite upper holding roller 43e.

Since all lower holding rollers 46 are supported on lower plate 45 with springs 47 interposed individually, and the position of upper plate 42 can be adjusted vertically by linear actuator 41 in the present embodiment, upper plate 42 is brought closer to lower plate 45 by linear actuator 41 to allow the compression of spring 47 supporting lower holding roller 46e at the protruding position under opposite upper holding roller 43e to sandwich film F between all the lower holding rollers and upper holding rollers.

Since lower holding rollers 46 are supported on lower plate 45 with springs 47 interposed, and upper plate 42 can be adjusted vertically by linear actuator 41, the following advantage can be provided.

In stretching film F in the MD, the amount of the neck-in is typically increased as the stretching rate is increased. Thus, in stretching film F at a high stretching rate, film F is preferably sandwiched at both end portions in the TD with a higher force accordingly. Since the support of lower holding rollers 46 with springs 47 interposed is combined with the vertically movable structure of upper holding rollers 43 through linear actuator 41 in the present embodiment, the force to sandwich film F between upper holding rollers 43 and lower holding rollers 46 can be adjusted in accordance with the stretching rate of film F or the like.

While the above embodiment has described the case where upper plate 42 can be vertically moved by linear actuator 41, lower plate 45 may be vertically moved or both of upper plate 42 and lower plate 45 can be vertically moved. Similarly, while the above embodiment has described the case where the plurality of lower holding rollers 46 are supported individually on lower plate 45 with the plurality of springs 47, the plurality of upper holding rollers 43 may be supported to be elastically and vertically displaceable individually by a plurality of springs, or both of upper holding rollers 43 and lower holding rollers 4 may be supported to be elastically and vertically displaceable individually.

An arbitrary heating method may be used in heating furnace 30 as long as film F can be heated to a degree that it is softened. For example, heating with infrared rays, heating with hot air, and a combination thereof can be used. The entire film is preferably heated uniformly as much as possible in order to perform uniform stretching. Especially, in the present embodiment, film holding unit 40 is provided at both end portions in the TD of film F, and both end portions in the TD of film F are somewhat difficult to heat as compared with the other portions. Thus, in view of the simplicity, the cost and the like of the apparatus, it is preferable in the present embodiment to use the heat furnace with hot air in which upper holding rollers 43 and lower holding rollers 46 in contact with film F are also heated to enable indirect heating of both end portions in the TD of film F, rather than the heating method with infrared rays.

Since furnace 30 heats film F during the transfer, it structurally has inlet-side opening 31 and outlet-side opening 32 for the passage of film F. Part of air heated within heating furnace 30 flows out through inlet-side opening 31 and outlet-side opening 32. Thus, depending on the temperature within heating furnace 30 and the size of openings 31 and 32, film F may be stretched near openings 31 and 32 even outside heating furnace 30.

In the present embodiment, as shown in FIG. 1 and FIG. 2, the upstream side and the downstream side of film holding unit 40 in the MD of film F are placed outside heating furnace 30 through inlet-side opening 31 and outlet-side opening 32, so that some of the plurality of upper holding rollers 43 and some of the plurality of lower holding rollers 46 are placed outside heating furnace 30. This can suppress the occurrence of the neck-in due to the stretching more effectively. It goes without saying that entire film holding unit 40 may be placed within heating furnace 40 when the outflow of the heated air from inlet-side opening 31 and outlet-side opening 32 does not need to be considered seriously.

Figure 5:
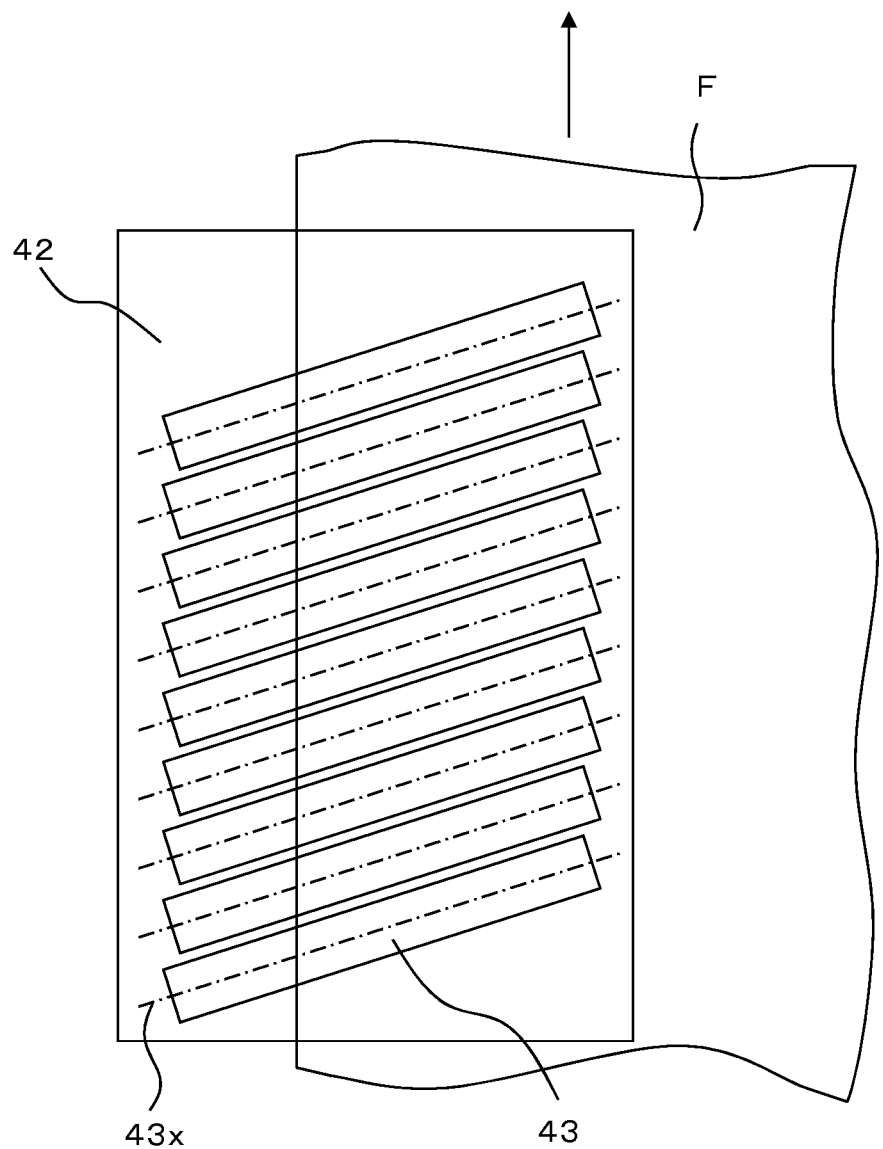
FIG. 5 A schematic diagram showing another example of the placement of the upper holding rollers.

The present embodiment has shown the example in which the plurality of upper holding rollers 43 (and thus lower holding rollers 46) are placed to be shifted outward in the TD of film F from upstream to downstream of the MD of film F as shown in FIG. 2 and FIG. 3. This is achieved by placing the rotational axis of upper holding roller 43 in parallel with the width direction of rectangular upper plate 42 and installing upper plate 42 in the inclined position. However, for example as shown in FIG. 5, the plurality of upper holding rollers 43 may be mounted with rotational axis 43x inclined relative to the TD of upper plate 42, and upper holding rollers 43 are placed at the same positions in the TD of film F. In this case, lower holding rollers 46 are naturally placed similarly. This placement of upper holding rollers 43 and lower holding rollers 46 can also suppress the neck-in during the stretching favorably.

As described above, in the present embodiment, upper holding rollers 43 and lower holding rollers 46 are rotated in association with the transfer of film F, and it is important to perform the rotation smoothly in association with the transfer of film F in order to suppress the neck-in favorably. To perform the smooth rotation of upper holding rollers 43 and lower holding rollers 46, rough-surface treatment such as graining including sandblast and embossing is preferably performed on the circumferential surfaces of holding rollers 43 and 46 to increase the friction force acting on film F. Alternatively, the friction force acting on film F may be increased by using upper holding rollers 43 and lower holding rollers 46 formed of rubber rollers, and providing the rubber rollers as hollow air rollers expanded by an air pressure.

The inclination angle of the rotational axis of each of upper holding rollers 43 and lower holding rollers 46 relative to the TD of film F is preferably set in accordance with the stretching rate in the MD of film F. Since the neck-in amount of film F is increased as the stretching rate is increased, both end portions in the TD of film F needs to be restrained tightly in order to prevent the neck-in. The inclination angle is preferably increased in order to increase the force to restrain film F in the TD. However, when the inclination angle is excessively increased, the force to restrain film F in the MD is increased to raise the possibility that the stretching may not be performed appropriately. For this reason, the inclination angle has an appropriate range which is larger than 0° and smaller than 45°, more preferably, larger than 0° and equal to or smaller than 30°, and more preferably, larger than 0° and equal to or smaller than 15°.

The above embodiment has shown the mechanism having at least one feed roller and at least one take-up roller as the advancing mechanism and the take-in mechanism, respectively, in the present invention. However, the advancing mechanism and the take-in mechanism are not limited to the mechanism which transfers the film with the rollers. For example, a film grasp member grasping end portions in the TD of film F and simultaneously moving in the MD of the film is placed on both sides in the TD of film F on the advancing side and the take-in side of the film, and the film grasp member on the take-in side is moved at a speed higher than a speed of the film advanced from the grasp member on the advancing side, thereby allowing the grasp members on the advancing side and take-in side to be used as the advancing mechanism and the take-in mechanism, respectively. Alternatively, at least one of the advancing mechanism and the take-in mechanism may be formed of a combination of the roller and the grasp member.

Next, an example of the process of manufacturing the biaxially stretched film with stretching apparatus 1 of the above present embodiment is described with reference to FIG. 6.

First, a molten resin is molded into film form to produce a film (S101). Examples of the film molding method include an extrusion-molding method, a solution-casting method, and a calendaring method.

Next, while the molded film is transferred by the rollers, the film is stretched in the MD (S102). The stretching typically occurs the neck-in, but the neck-in is suppressed by using stretching apparatus 1 in the above embodiment.

The film stretched in the MD is then stretched in the TD (S103). The stretching in the TD can be performed by using a tenter apparatus or the like. Since the neck-in conventionally occurs due to the stretching in the MD, extra stretching of the reduced width due to the neck-in is required in addition to a desired stretching amount, which may occur a film break and imposes a large mechanical load on the stretching apparatus.

In the present embodiment, however, the neck-in is suppressed by using stretching apparatus 1 described above for the stretching in the MD, and it is not necessary to increase the stretching rate in the TD as conventional. As a result, film breaks can be substantially reduced to stretch the film in the TD at a desired stretching rate to provide the film having a desired coefficient of thermal expansion.

Finally, the film stretched in the TD is cured (S104) and is taken up on the roller (S105) to manufacture the biaxially stretched film. Examples of the method of curing the film include heating, the use of a catalyst, application of ultraviolet rays (UV), application of electron beams, and a combination thereof.

As described above, the use of above stretching apparatus 1 for stretching the film in the TD allows the manufacture of the biaxially stretched film stretched in the MD and the TD at a desired stretching rate and thus having a desired coefficient of thermal expansion in the MD and the TD while film breaks during the stretching in the TD are reduced substantially.

While the stretching apparatus according to the present invention can be used for stretching various films in the MD, it can be used particularly preferably for stretching a self-supporting film in the MD during manufacture of a polyimide film among the films.

In the following, description is made of an example of a method of manufacturing the polyimide film in which the above stretching apparatus is used for stretching the self-supporting film in the MD.

The method of manufacturing the polyimide film according to the present invention includes a first step of casting a solution containing a polyimide precursor in a solvent onto a support to provide a self-supporting film and a second step of heating the self-supporting film provided at the first step during transfer. The second step includes stretching the self-supporting film in the MD with the above stretching apparatus.

Figure 6:
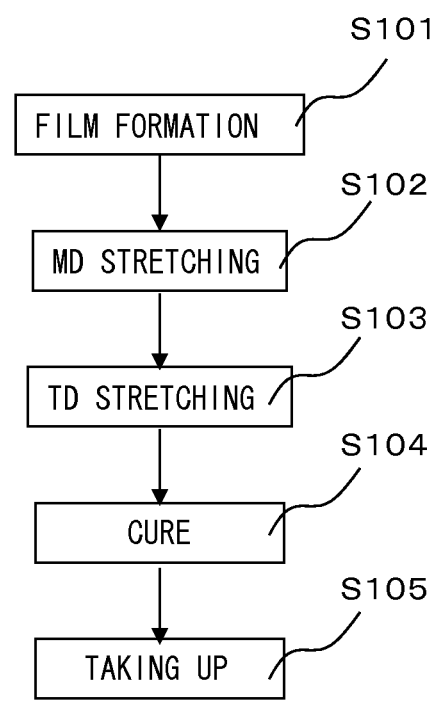
FIG. 6 A chart showing an example of a manufacture flow of a sequentially biaxially stretched film.

More specifically, as shown in FIG. 6, the method of manufacturing the polyimide film according to the present invention includes the first step of casting (S101) the solution containing the polyimide precursor in the solvent onto the support to provide the self-supporting film and the second step of heating the self-supporting film in order to perform heat treatment including imidization and/or stretching during the transfer. The second step includes stretching the self-supporting film in the Machine Direction (S102), then stretching the film in the Transverse Direction (S103), and performing thermal cure (S104). The polyimide film finally manufactured through the thermal cure is taken up on the roller (S105).

In the above manufacture method, the step of "casting the solution containing the polyimide precursor in the solvent onto the support," the step of "stretching the self-supporting in the MD," the step of "stretching the film in the TD," the step of "performing the thermal cure," and the step of "taking up the finally manufactured polyimide film on the roller" correspond to a "film forming" step (S101), an "MD stretching" step (S102), a "TD stretching" step (S103), a "cure" step (S104), and a "taking up" step (S105) in FIG. 6, respectively.

The stretching apparatus according to the present invention is used at the MD stretching step of those steps. Thus, when the stretching apparatus according to the present invention is used for the MD stretching of the polyimide film, "film F" in the description of the above stretching apparatus means the "self-supporting film."

In the present invention, polyimide film may be manufactured by thermal imidization, chemical imidization or a method using thermal imidization and chemical imidization in combination.

In the following, the first step and the second step are described in detail.

<First Step>

As a polyimide precursor for forming the self-supporting film in the first step, used is known polyimide precursors such as a polyamic acid obtained from known acid component and diamine component.

In the present invention, finally produced polyimide layer may be formed from one layer or multilayers having different component. Preferably, at least one layer in the layer(s) constituting the polyimide film is formed of a heat resistance polyimide. The examples of multilayer structure include an example in which layer(s) of a thermo-compression bonding polyimide is formed on one side or both sides of a layer of a heat resistant polyimide, an example in which a surface is formed of a layer excellent in surface flatness while another surface is formed of a layer excellent in slippery, and an example in which at least one layer is formed of a layer excellent in transparency or non-transparency.

In accordance with the finally produced polyimide film, the self-supporting film may also be formed from one layer or multilayer having different component.

As the heat resistant polyimide, there can be used polyimide obtained from the combination of:

(1) an acid component containing at least one selected from 3,3',4,4'-biphenyltetracarboxylic dianhydride, pyromellitic dianhydride and 1,4-hydroquinone dibenzoate-3,3',4,4'-tetracarboxylic dianhydride, and preferably an acid component containing these acid components in an amount of at least not less than 70 mole %, further preferably not less than 80 mole % and more preferably not less than 90 mole %; and (2) diamine component containing at least one selected from p-phenylene diamine, 4,4'-diaminodiphenyl ether, 3,4'-diaminodiphenyl ether, m-tolidine and 4,4'-diamino benzanilide, and preferably a diamine component containing these diamine components in an amount of at least not less than 70 mole %, further preferably not less than 80 mole % and more preferably not less than 90 mole %.

Preferable examples of the combination of the acid component and the diamine component constituting the heat resistant polyimide include 1) 3,3',4,4'-biphenyltetracarboxylic dianhydride(s-BPDA), and p-phenylenediamine (PPD) and optionally 4,4'-diaminodiphenyl ether (DADE), wherein PPD/DADE (molar ratio) is preferably from 100/0 to 85/15;

2) 3,3',4,4'-biphenyltetracarboxylic dianhydride and pyromellitic dianhydride, and p-phenylenediamine and optionally 4,4'-diaminodiphenyl ether, wherein BPDA/PMDA is preferably 0/100 to 90/10, and in case both PPD and DADE are used, PPD/DADE is preferably, for example, 90/10 to 10/90;

3) pyromellitic dianhydride, and p-phenylenediamine and 4,4'-diaminodiphenyl ether, wherein DADE/PPD is preferably 90/10 to 10/90; and 4) 3,3',4,4'-biphenyltetracarboxylic dianhydride and p-phenylene diamine, as main ingredient components (not less than 50 mole % in the total 100 mole %).

In the above 1) to 4), part or all of 4,4'-diaminodiphenyl ether (DADE) may be replaced with 3,4'-diaminodiphenyl ether or another diamine described later.

These are used as materials of electronic parts such as printed wiring boards, flexible printed circuit boards, TAB tapes and the like, and they are preferred because they have excellent mechanical properties over a wide temperature range, long-term heat resistance, excellent hydrolysis resistance and chemical resistance, a high heat decomposition initiation temperature, small heat shrinkage ratio and coefficient of thermal expansion, and excellent flame retardancy.

As the acid component that may be used for obtaining the heat resistant polyimide, in addition to the acid components illustrated above, there can be used an acid dianhydride component such as 2,3,3',4'-biphenyltetracarboxylic dianhydride, 3,3',4,4'-benzophenonetetracarboxylic dianhydride, bis(3,4-dicarboxyphenyl)ether dianhydride, bis(3,4-dicarboxyphenyl)sulfide dianhydride, bis(3,4-dicarboxyphenyl)sulfone dianhydride, bis(3,4-dicarboxyphenyl)methane dianhydride, 2,2-bis(3,4-dicarboxyphenyl)propane dianhydride, 2,2-bis(3,4-dicarboxyphenyl)-1,1,1,3,3,3-hexafluoropropane dianhydride, 2,2-bis[(3,4-dicarboxyphenoxy)phenyl]propane dianhydride or the like, in the ranges in which the characteristics of the present invention are not impaired.

As the diamine component that may be used for obtaining the heat resistant polyimide, in addition to the diamine components illustrated above, there can be used a diamine component such as m-phenylene diamine, 2,4-toluene diamine, 3,3'-diaminodiphenyl sulfide, 3,4'-diaminodiphenyl sulfide, 4,4'-diaminodiphenyl sulfide, 3,3'-diaminodiphenyl sulfone, 3,4'-diaminodiphenyl sulfone, 4,4'-diaminodiphenyl sulfone, 3,3'-diaminobenzophenone, 4,4'-diaminobenzophenone, 3,4'-diaminobenzophenone, 3,3'-diaminodiphenyl methane, 4,4'-diaminodiphenyl methane, 3,4'-diaminodiphenyl methane, 2,2-di(3-aminophenyl)propane, 2,2-di(4-aminophenyl)propane, bis(aminophenoxy)benzenes such as 1,3-bis(4-aminophenoxy)benzene, 1,4-bis(4-aminophenoxy)benzene, 1,3-bis(3-aminophenoxy)benzene, 1,4-bis(3-aminophenoxy)benzene, 2,2-bis[4-(4-aminophenoxy)phenyl]propane, 4,4'-bis(4-aminophenoxy)biphenyl and the like, in the ranges in which the characteristics of the present invention are not impaired.

As a thermo-compression bonding polyimide, there can be used polyimide obtained from:

(1) an acid component containing at least one component selected from acid dianhydrides such as 3,3',4,4'-biphenyltetracarboxylic dianhydride, 2,3,3',4'-biphenyltetracarboxylic dianhydride, pyromellitic dianhydride, 3,3',4,4'-benzophenonetetracarboxylic dianhydride, bis(3,4-dicarboxyphenyl)ether dianhydride, bis(3,4-dicarboxyphenyl)sulfide dianhydride, bis(3,4-dicarboxyphenyl)sulfone dianhydride, bis(3,4-dicarboxyphenyl)methane dianhydride, 2,2-bis(3,4-dicarboxyphenyl)propane dianhydride, 1,4-hydroquinone dibenzoate-3,3',4,4'-tetracarboxylic dianhydride and the like, and preferably an acid component containing these acid components in an amount of at least not less than 70 mole %, further preferably not less than 80 mole % and more preferably not less than 90 mole %, and (2) a diamine component containing at least one component selected from diamines such as 1,3-bis(4-aminophenoxy)benzene, 1,3-bis(3-aminophenoxy)benzene, 1,4-bis(4-aminophenoxy)benzene, 3,3'-diaminobenzophenone, 4,4'-bis(3-aminophenoxy)biphenyl, 4,4'-bis(4-aminophenoxy)biphenyl, bis[4-(3-aminophenoxy)phenyl]ketone, bis[4-(4-aminophenoxy)phenyl]ketone, bis[4-(3-aminophenoxy)phenyl]sulfide, bis[4-(4-aminophenoxy)phenyl]sulfide, bis[4-(3-aminophenoxy)phenyl]sulfone, bis[4-(4-aminophenoxy)phenyl]sulfone, bis[4-(3-aminophenoxy)phenyl]ether, bis[4-(4-aminophenoxy)phenyl]ether, 2,2-bis[4-(3-aminophenoxy)phenyl]propane, 2,2-bis[4-(4-aminophenoxy)phenyl]propane and the like as a diamine component, and preferably a diamine component containing these diamine components in an amount of at least not less than 70 mole %, further preferably not less than 80 mole % and more preferably not less than 90 mole %.

As the combination of the acid component and the diamine component that can be used for obtaining the thermo-compression bonding polyimide, there can be used polyimide obtained from:

(1) an acid component containing at least one component selected from acid dianhydrides such as 3,3',4,4'-biphenyltetracarboxylic dianhydride and 2,3,3',4'-biphenyltetracarboxylic dianhydride, and preferably an acid component containing these acid components in an amount of at least not less than 70 mole %, further preferably not less than 80 mole % and more preferably not less than 90 mole %; and (2) a diamine component containing at least one component selected from diamines such as 1,3-bis(4-aminophenoxy)benzene, 1,3-bis(3-aminophenoxy)benzene, 4,4'-bis(3-aminophenoxy)biphenyl, bis[4-(3-aminophenoxy)phenyl]sulfone, bis[4-(3-aminophenoxy)phenyl]ether, 2,2-bis[4-(3-aminophenoxy)phenyl]propane, 2,2-bis[4-(4-aminophenoxy)phenyl]propane and the like as a diamine component, and preferably a diamine component containing these diamine components in an amount of at least not less than 70 mole %, further preferably not less than 80 mole % and more preferably not less than 90 mole %.

As the diamine component that may be used for obtaining the thermo-compression bonding polyimide, in addition to the diamine components illustrated above, there can be used a diamine component such as p-phenylene diamine, m-phenylene diamine, 2,4-toluene diamine, 3,4'-diaminodiphenyl ether, 3,3'-diaminodiphenyl sulfide, 3,4'-diaminodiphenyl sulfide, 4,4'-diaminodiphenyl sulfide, 3,3'-diaminodiphenyl sulfone, 3,4'-diaminodiphenyl sulfone, 4,4'-diaminodiphenyl sulfone, 3,3'-diaminobenzophenone, 4,4'-diaminobenzophenone, 3,4'-diaminobenzophenone, 3,3'-diaminodiphenyl methane, 4,4'-diaminodiphenyl methane, 3,4'-diaminodiphenyl methane, 2,2-di(3-aminophenyl)propane, 2,2-di(4-aminophenyl)propane and the like, in the ranges in which the characteristics of the present invention are not impaired.

A polyimide precursor may be synthesized by known methods, for example, by random-polymerizing or block-polymerizing substantially equimolar amounts of an aromatic tetracarboxylic dianhydride and an aromatic diamine in an organic solvent. Alternatively, two or more polyimide precursors in which either of these two components is excessive may be prepared, and subsequently, these polyimide precursor solutions may be combined and then mixed under reaction conditions. The polyimide precursor solution thus obtained may be used without any treatment, or may be used after removing or adding a solvent, if necessary, for the preparation of a self-supporting film.

Furthermore, in the case that polyimide excellent in solubility is used, the organic solvent solution of the polyimide can be obtained by heating the polyimide precursor solution at 150 to 250° C., or adding an imidization agent to perform reaction at not more than 150° C., particularly from 15 to 50° C., and followed by evaporating the solvent after imide-cyclizing, or followed by precipitation in a poor solvent to give powder, and dissolving the powder in the organic solution.

Examples of an organic solvent for the polyimide precursor solution include N-methyl-2-pyrrolidone, N,N-dimethylformamide, N,N-dimethylacetamide and N,N-diethylacetamide. These organic solvents may be used alone or in combination of two or more.

The polyimide precursor solution may contain an imidization catalyst, an organic phosphorous-containing compound, a fine particle such as an inorganic fine particle, an organic fine particle and the like, if necessary.

Examples of the imidization catalyst include substituted or unsubstituted nitrogen-containing heterocyclic compounds, N-oxide compounds of the nitrogen-containing heterocyclic compounds, substituted or unsubstituted amino acid compounds, hydroxyl-containing aromatic hydrocarbon compounds, and aromatic heterocyclic compounds. Particularly preferable examples of the imidization catalyst include lower-alkyl imidazoles such as 1,2-dimethylimidazole, N-methylimidazole, N-benzyl-2-methylimidazole, 2-methylimidazole, 2-ethyl-4-methylimidazole and 5-methylbenzimidazole; benzimidazoles such as N-benzyl-2-methylimidazole; and substituted pyridines such as isoquinoline, 3,5-dimethylpyridine, 3,4-dimethylpyridine, 2,5-dimethylpyridine, 2,4-dimethylpyridine and 4-n-propylpyridine. The amount of the imidization catalyst to be used is preferably about 0.01 to 2 equivalents, particularly preferably about 0.02 to 1 equivalents relative to the amide acid unit in a polyamide acid. When the imidization catalyst is used, the polyimide film obtained may have improved properties, particularly extension and edge-cracking resistance.

When chemical imidization is intended, generally, a chemical imidization agent of the combination of a dehydration-ring closure agent and an organic amine is mixed in the polyimide precursor solution. The examples of dehydration-ring closure agent include, for example, dicyclohexylcarbodiimide and acid anhydride such as acetic anhydride, propionic anhydride, valeric anhydride, benzoic anhydride, trifluoroacetic anhydride; and the examples of organic amine include, for example, picoline, quinoline, isoquinoline, pyridine and the like; but not especially limited to these.

There are no particular restrictions to the polyimide precursor solution, so long as it may be cast on a support and converted into a self-supporting film which may be peeled from the support and be stretched in at least one direction. The kind, polymerization degree and concentration of the polymer, and the kind and concentration of an additive which may be added to the solution, if necessary, and the viscosity of the solution may be appropriately selected.

The concentration of the polyimide precursor in the polyimide precursor solution is preferably 5 to 30 mass %, more preferably 10 to 25 mass %, and further preferably 15 to 20 mass %. Viscosity of the polyimide precursor solution is preferably 100 to 10000 poise, more preferably 400 to 5000 poise, further preferably 1000 to 3000 poise.

One example of the process for producing a self-supporting film in the first step is as follows.

Using a film-forming machine equipped with a single-layer or multi-layer extrusion die, a solution of a polyimide precursor in a solvent, or two or more solutions of polyimide precursors in solvents are fed to the die, and then extruded from the outlet (lip) of the die onto a support (endless belt, drum and the like) in the form of a single-layer or multi-layer thin film, to provide a thin film of the solution(s) of the polyimide precursor(s) in the solvent(s) having a substantially uniform thickness. And then, in a casting oven, while moving the support (endless belt, drum and the like), the thin film is heated at a temperature at which imidization of the polyimide precursor(s) does not fully proceed and a part of or most of the organic solvent(s) are removed from the thin film. And, the self-supporting film is peeled from the support.

When a multilayer polyimide film is intended to be manufactured, it may be manufactured by a method including: forming a self-supporting film from a solution of a polyimide precursor having a predetermined formulation, casting on the surface thereof a solution of a polyimide precursor having another formulation, and heating it in a casting oven to form a multilayer self-supporting film.

The support in the first step may be formed from any known material. The support may preferably have a surface made of metal such as stainless steel or resin such as polyethylene terephthalate. Examples of the support include a stainless belt, a stainless roll, and a polyethylene terephthalate belt. The support may preferably have a surface on which a uniform thin film of a solution is formed. The support may particularly preferably have a smooth flat surface, although the support may have a groove and/or emboss in the surface. Particularly, the smooth flat surface is preferred.

The heating temperature in the casting oven is a temperature at which imidization of the polyimide precursor(s) does not fully proceed and a part of or most of the organic solvent(s) can be removed, and is for example, from 30° C. to 200° C. In the case of thermal imidization (i.e. in the case that no chemical imidization agent is added), it is preferably from 100° C. to 200° C.

The self-supporting film is in or before semi-dried state. The term "in or before semi-dried state" means the film is in a self-supporting state by thermal and/or chemical imidization. The solvent content ratio and imidization ratio of the self-supporting film may be in any range as long as the self-supporting film can be peeled from the support.

After the self-supporting film is peeled from the support, the self-supporting film may be, if necessary, further coated with a solution (in which surface treating agent, polyimide precursor or polyimide may be contained) by coating, spraying or dipping, and if necessary, mainly the coating solution may be removed by drying or extraction.

The examples of the surface treating agent include various coupling agents or chelating agents such as silane coupling agent, borane coupling agent, aluminum-based coupling agents, aluminum-based chelating agent, titanate-based coupling agent, iron coupling agent, copper coupling agent and the like.

The solvent content ratio and imidization ratio of the self-supporting film may be set appropriately according to the polyimide film intended to be manufactured. Herein, solvent content means the amount of volatile component including produced water in addition to the solvent in the precursor solution. For example, when polyimide is manufactured from the precursor comprising tetracarboxylic acid component containing 3,3',4,4'-biphenyletracarboxylic dianhydride by 80 mole % and diamine component containing p-phenylene diamine by 80 mole % and polyimide film is preferably manufactured by thermal imidization, the imidization ratio is 1 to 80%, preferably 5 to 40%, the solvent content is preferably 10 to 60 mass %, more preferably 25 to 45 mass %.

When polyimide is manufactured from the precursor comprising tetracarboxylic acid component containing pyromellitic dianhydride by 80% and diamine component containing p-phenylene diamine by 80% and polyimide film is preferably manufactured by thermal imidization, the imidization ratio is 50 to 100%, preferably 70 to 100%, the solvent content is preferably 10 to 80 mass %, more preferably 20 to 70 mass %.

The self-supporting film manufactured in the first step is, if necessary after coated with a surface treating agent and the like, forwarded to the second step.

<Second Step>

At the second step, the self-supporting film manufactured at the first step is subjected to the heat treatment (stretching and thermal cure) to provide the polyimide film having desired physical properties. In the present invention, the stretching apparatus described above is used in the stretching of the self-supporting film in the MD. Since the self-supporting film is stretched in the MD with both end portions in the TD of the self-supporting film sandwiched by the film holding unit having the plurality of upper holding rollers and lower holding rollers diagonally placed as described above, the occurrence of the neck-in can be suppressed favorably.

After the stretching in the MD, the self-supporting film is preferably stretched in the TD by the tenter apparatus. Since the conventional method involves the neck-in due to the stretching in the MD, it is necessary to perform the extra stretching of the reduced width due to the neck-in in addition to a desired stretching amount, which may cause a film break and imposes a large mechanical load on the stretching apparatus. In the present invention, however, the neck-in is suppressed by using the stretching apparatus described above for the stretching in the MD, so that the stretching rate in the TD does not need to be increased as conventional. Consequently, film breaks can be reduced substantially and the film can be stretched in the TD at a desired stretching rate to provide the polyimide film having a desired coefficient of thermal expansion.

The self-supporting film is moved at a predetermined speed in the heating zone at a predetermined temperature to perform the transfer. In the meantime, the self-supporting film is subjected to the heat treatment, and the imidization (thermal cure) proceeds. Finally, the polyimide film is obtained.

The tenter apparatus can be used for the stretching of the self-supporting film in the TD. The tenter apparatus has a pair of tenter chains grasping both end portions in the TD of the self-supporting film and can stretch the self-supporting film in the TD by changing the interval between the tenter chains to increase during the movement of the chains in the MD. The tenter apparatus can also be used for transferring the self-supporting film in the thermal cure. Thus, the tenter apparatus can be used to perform the stretching of the self-supporting film in the TD and the thermal cure continuously or simultaneously.

In thermal cure in the second step, the heat treatment is preferably conducted gradually in about 0.05 to 5 hours in such a condition that maximum temperature is in the range from 200 to 600° C., preferably from 350 to 550° C., particularly preferably 300 to 500° C. Preferably, solvent and the like is fully removed from the self-supporting film so that volatile content including organic solvent and produced water and the like in a finally obtained polyimide film is reduced to 1% by weight or less, and simultaneously the polymer is fully imidized.

It is also preferred that the heating zone has a temperature gradient or may be divided into blocks having a different heating temperature. In an embodiment, the heat treatment may be conducted by a process including the first heat treatment at a relatively lower temperature of about 100 to 170° C. for about 0.5 to 30 min, successively the second heat treatment at 170 to 220° C. for about 0.5 to 30 min, then the third heat treatment at a high temperature of 220 to 400° C. for about 0.5 to 30 min, and, if necessary, the fourth high-temperature heat treatment at 400 to 600° C. In another embodiment, the heat treatment may be conducted by a process including the first heat treatment at 80 to 240° C., if necessary heat treatment at intermediate temperature range, and final heat treatment at 350 to 600° C.

The above heat treatment may be carried out by using various known heating device, such as hot-air oven, infrared heating furnace, and the like. The heat treatment such as initial heating temperature, intermediate heating temperature and/or final heating temperature of the self-supporting film is preferably carried out under heated gas atmosphere of inert gas, for example nitrogen or argon, or air and the like.

Since the polyimide is obtained in lengthy form after the above manufacturing process, generally it is wound and stored as a role after the both ends of the film in the TD held by the tenter apparatus is cut off, then it is provided to the next processing.

The thickness of the polyimide film is selected appropriately and is not particularly limited, but it may be 150 μm or less, preferably 5 to 120 μm, more preferably 8 to 80 μm, more preferably 6 to 50 μm, further preferably 7 to 40 μm, particularly preferably 8 to 35 μm.

As described above, the stretching apparatus shown in FIG. 1 and the like is used at the second step of performing the imidization and/or heat treatment of the self-supporting film in the process of manufacturing the polyimide film. Since the stretching apparatus can suppress the neck-in favorably, film breaks can be reduced during the stretching in the TD performed subsequently. As a result, it is possible to manufacture efficiently the polyimide film stretched in the MD and the TD at a desired stretching rate and having a desired coefficient of thermal expansion with excellent heat dimensional stability. For example, the coefficient of thermal expansion of the polyimide film can be limited to a range from 5 to 15 ppm/° C. both in the MD and the TD.

EXAMPLES

Example 1

In Example 1, the neck-in rate was determined when the polyimide film (self-supporting film) was stretched in the MD under various conditions.

Example 1-1

N,N-dimethylacetamide was used as a solvent, and p-phynylenediamine (PPD) as a diamine component and 3,3',4,4'-biphenyltetracarboxylic acid dianhydride (s-BPDA) as an acid component were polymerized to provide a polyamic acid solution (polyimide precursor solution). The provided polyamic acid solution was cast onto a support and heated to provide the partially imidized self-supporting film.

Next, stretching apparatus 1 formed as shown in FIG. 1 was used to stretch the polyimide film (self-supporting film) produced with a width of 270 mm in the MD, and the neck-in rate was measured. Stretching apparatus 1 used had film holding unit 40 having 10 upper holding rollers 43 and 10 lower holding roller 46. Each of upper holding rollers 43 and lower holding rollers 46 had a rotation axis with an inclination angle of 25°, a diameter of 20 mm, and a length of 50 mm. The adjacent rollers had a pitch of 22 mm between the axes. Each of upper holding rollers 43 and lower holding rollers 46 was made of stainless steel (SUS304), and the surface thereof was subjected to shot blast treatment to provide a surface roughness Ra of 2 to 3 μm. An air cylinder (with a diameter of 63 mm) was connected to upper plate 42, and air was supplied at a pressure of 0.06 MPa to the air cylinder to hold the self-supporting film (polyimide film) between upper holding rollers 43 and lower holding rollers 46. Heating furnace 30 of the heating method using hot air was used and set such that the temperature was at 120° C. and the hot air had an average speed of 0.7 m/s within heating furnace 30. The heating time for the self-supporting film with heating furnace 30 was set to 15 seconds. Heating furnace 30 had a width capable of heating the entire width of the film, and some of upper holding rollers 43 and some of lower holding rollers 46 uniformly protruded outside heating furnace 30 from the inlet-side opening and the outlet-side opening to hold the self-supporting film.

The stretching rate was determined by measuring lengths Lb and La in the following calculation expression:

$$\text{Stretching rate} = \left(\frac{La}{Lb} - 1\right) \times 100 (\%)$$

where Lb represents the length of the film in the MD before the stretching and La represents the length after the stretching. The neck-in rate was determined by measuring widths Wb and Wa in the following calculation expression:

$$\text{Neck-in Rate} = -\left(\frac{Wa}{Wb} - 1\right) \times 100 (\%)$$

where Wb represents the width of the film before the stretching and Wa represents the width after the stretching.

As a result of the stretching, the stretching rate was 9.17% and the neck-in rate was 0.74%.

Example 1-2

The self-supporting film (polyimide film) was stretched by using the stretching apparatus formed similarly to that in Example 1-1 except that lower supporting rollers 46 were supported without any springs 47 interposed and that heating furnace 30 employed the heating method using application of infrared rays. The stretching rate and the neck-in rate were determined similarly to Example 1-1. As a result of the stretching, the stretching rate was 8.67% and the neck-in rate was 2.24%.

Comparative Example 1-1

The self-supporting film (polyimide film) was stretched under the same conditions as those in Example 1-2 except that a stretching apparatus having no film holding unit 40 was used. The stretching rate and the neck-in rate were determined similarly to Example 1-1. As a result of the stretching, the stretching rate was 9.24% and the neck-in rate was 5.73%.

The main stretching conditions, and the determined stretching rates and neck-in rates in Examples 1-1, 1-2, and Comparative Example 1-1 are shown in Table 1.

TABLE 1

| | Conditions | | | | Results | |
| --- | --- | --- | --- | --- | --- | --- |
| | Film holding unit | Roller support springs | Heating method | Air pressure (MPa) | Stretching rate (%) | Neck-in rate (%) |
| Example 1-1 | used | used | hot air | 0.06 | 9.17 | 0.74 |
| Example 1-2 | used | not used | infrared rays | 0.06 | 8.67 | 2.24 |
| Comparative Example 1-1 | not used | — | infrared rays | — | 9.24 | 5.73 |

It is apparent from Table 1 that the stretching performed with both end portions of the film in the TD sandwiched by the film holding unit can reduce the neck-in rate to a half or less even at the similar stretching rate as compared with the case where the film holding unit was not used. Especially, the combination of the support of the lower supporting rollers with the springs and the heating of the film with hot air can further reduce the neck-in rate.

Example 2

In Example 2, the relationship was investigated between the set stretching rate of the apparatus in stretching the polyimide film (self-supporting film), the actual stretching rate measured in the polyimide film obtained by performing the thermal cure of the self-supporting film after the stretching, and the coefficient of thermal expansion.

For the coefficient of thermal expansion, a thermal-mechanical analyzer TMA/SS6100 manufactured by Seiko Instruments Inc. was used to measure the average coefficient of thermal expansion from 50 to 200° C. when the temperature was raised at a rate of 20° C./min.

Example 2-1

The produced polyimide film (self-supporting film) was stretched in the MD by using the same stretching apparatus 1 as that used in Example 1-1. The stretching rate was set to 12%. To sandwich the self-supporting film (polyimide film) between upper holding rollers 43 and lower holding rollers 46, the pressure of air supplied to the air cylinder was set to 0.06 MPa. Next, the self-supporting film (polyimide film) stretched in the MD was stretched in the TD by the tenter apparatus to provide sequentially biaxially stretched film. The stretching rate in the width direction in this case was set to 12%. The stretching temperature and the time were set to 140 to 170° C. and 143 seconds, respectively.

The thermal cure was subsequently performed in the same tenter apparatus. In the thermal cure, heating was performed in the heating furnace for 280 seconds such that the final heating temperature was 480° C.

The coefficient of thermal expansion of the obtained polyimide film was measured, and the results were 6.11 ppm/° C. for the MD and 4.80 ppm/° C. for the TD. The actual stretching rate determined similarly to Example 1 was 11.8% for the MD and 15.4% for the TD, and the neck-in rate was 0.18%.

Comparative Example 2-1

The self-supporting film (polyimide film) was stretched in the MD and the TD under the same conditions as those in Example 2-1 except that a stretching apparatus having no film holding unit 40 was used, thereby providing the sequentially biaxially stretched film. The stretching rates were set to 12%. The coefficient of thermal expansion of the obtained biaxially stretched film was measured, and the results were 4.33 ppm/° C. for the MD and 11.22 ppm/° C. for the TD. The actual stretching rate was 11.9% for the MD and 8.0% for the TD, and the neck-in rate was 6.93%.

The main stretching conditions and the measurement results such as the coefficient of thermal expansion in Example 2-1 and Comparative Example 2-1 are shown in Table 2.

MD and the TD were measured in the obtained polyimide films similarly to Example described above.

Table 3 shows the stretching rates and the coefficients of thermal expansion of the obtained polyimide films. In Table 3, "Stretching rate" represents the set stretching rate of the stretching apparatus. In the box of Film holding unit, "O" means the MD stretching performed by the stretching apparatus having the film holding unit, and "X" means the MD stretching performed by the stretching apparatus having no film holding unit.

TABLE 2

| | Conditions | | | | | Results | | | | |
|---|---|---|---|---|---|---|---|---|---|---|
| | Film holding unit | Roller support springs | Heating method | Air pressure (Mpa) | Set stretching rate of apparatus (%) | | Actual stretching rate (%) | | Neck-in rate | Coefficient of thermal expansion (ppm/° C.) | |
| | | | | | MD | TD | MD | TD | | MD | TD |
| Example 2-1 | used | used | hot air | 0.06 | 12.0 | 12.0 | 11.8 | 15.4 | 0.18 | 6.11 | 4.80 |
| Comparative Example 2-1 | not used | not used | hot air | — | 12.0 | 12.0 | 11.9 | 8.0 | 6.93 | 4.33 | 11.22 |

It is apparent from Table 2 that little neck-in occurred with the film holding unit during the MD stretching. Since little neck-in occurred, the desired TD stretching was reliably performed, so that the coefficient of thermal expansion in the TD was reduced.

On the other hand, since the film holding unit was not used in Comparative Example 2-1, the large neck-in occurred during the MD stretching. The occurrence of the neck-in reduced the actual stretching rate even at the same set stretching rate of the apparatus in the TD as that in Example 2-1. As a result, the coefficient of thermal expansion in the TD was increased. In order to reduce the value, the set stretching rate of the apparatus in the TD needs to be further increased, which imposes the load on the tenter apparatus.

Example 3

In Example 3, a plurality of types of polyimide films with different stretching rates of self-supporting films were manufactured, and the coefficients of thermal expansion in the MD and the TD were measured in the obtained polyimide films. The stretching was performed in the MD and the TD or only in the MD. The stretching apparatus shown in FIG. 1 and the like having upper holding rollers 43 and lower holding rollers 46 was used for the stretching in the MD. For the coefficient of thermal expansion, a thermal-mechanical analyzer TMA/SS6100 manufactured by Seiko Instruments Inc. was used to measure the average coefficient of thermal expansion from 50 to 200° C. when the temperature was raised at a rate of 20° C./min.

For comparison with the polyimide films obtained as described above, a plurality of types of polyimide films with different stretching rates were manufactured as Comparative Example similarly to the above-mentioned Example except that a conventional stretching apparatus having no film holding unit was used. The coefficients of thermal expansion in the

TABLE 3

| | Film holding unit | Stretching rate (%) | | Coefficient of thermal expansion (ppm/° C.) | |
|---|---|---|---|---|---|
| | | MD | TD | MD | TD |
| Example 3-1 | O | 5 | 10 | 6.4 | 10.9 |
| Comparative Example 3-1 | X | 4 | 10 | 10.5 | 13.5 |
| Example 3-2 | O | 10 | 0 | 4.1 | 16.2 |
| Comparative Example 3-2 | X | 10 | 0 | 6.3 | 16.1 |
| Example 3-3 | O | 10 | 10 | 6.9 | 6.6 |
| Comparative Example 3-3 | X | 10 | 13 | 10.4 | 12.3 |
| Example 3-4 | O | 10 | 15 | 7.3 | 3.2 |
| Comparative Example 3-4 | X | 10 | 16 | 10.2 | 9.8 |
| Reference Example 3-5 | O | 0 | 10 | 13.5 | 7.6 |
| Comparative Example 3-5 | X | 0 | 13 | 16.7 | 8.0 |
| Example 3-6 | O | 12 | 12 | 4.6 | 4.8 |
| Comparative Example 3-6 | X | 0 | 0 | 15.5 | 14.1 |

It is apparent from Table 3 that the films stretched by the stretching apparatus having the film holding unit had smaller coefficients of thermal expansion in the MD than those of the films stretched by the stretching apparatus having no film holding unit at any of the stretching rates. The effect of the reduction of the coefficient of thermal expansion in the TD is substantially the same as that in the MD stretching and is more obvious as the stretching rate is higher. For example, in comparison between Example 3-1 and Comparative Example 3-1, the effect of the reduction of the coefficient of thermal expansion in the TD is approximately 20%, but in comparison between Example 3-3 and Comparative Example 3-3 in which the MD stretching rate was increased, the effect of the reduction of the coefficient of thermal expansion in the TD is approximately 50%. In comparison between Example 3-2 and Comparative Example 3-2 in which the TD stretching was not performed, approximately equal coefficients of thermal expansion are shown in the TD, but in comparison between Example 3-4 and Comparative Example 3-4 in which the TD stretching rate was increased, the effect of the reduction of coefficient of thermal expansion is as high as approximately 70%. In Reference Example 3-5 with the increased efficiency of the reduction, the coefficient of thermal expansion can be reduced from approximately 15 ppm/° C. to approximately 5 ppm/° C. as compared with Comparative Example 3-6 in which no stretching was performed.

The coefficient of thermal expansion can be controlled to a lower range when the film holding unit is used, as compared with the case it is not used. Specifically, the coefficient of thermal expansion can be controlled both in the MD and the TD to a range from 5 to 15 ppm/° C.

DESCRIPTION OF REFERENCE NUMERALS

1 STRETCHING APPARATUS
10 FEED ROLLER
20 TAKE-UP ROLLER
30 HEATING FURNACE
40 FILM HOLDING UNIT
41 LINEAR ACTUATOR
42 UPPER PLATE
43 UPPER HOLDING ROLLER
45 LOWER PLATE
45a SUB-PLATE
46 LOWER HOLDING ROLLER
47 SPRING

The invention claimed is:

1. A stretching apparatus comprising:
an advancing mechanism for advancing a film;
a take-in mechanism for taking in the film advanced from the advancing mechanism at a speed higher than a speed of the film advanced from the advancing mechanism; and
two sets of film holding units placed at both end portions in a TD (Transverse Direction) of the film between the advancing mechanism and the take-in mechanism,
wherein each of the film holding units has:
a plurality of upper holding rollers placed in parallel at intervals in an MD (Machine Direction) of the film above a transfer path of the film; and
a plurality of lower holding rollers placed opposite to the upper holding rollers below the transfer path of the film such that the plurality of lower holding rollers work together with the plurality of upper holding rollers to place the film sandwiched vertically between the rollers, and
the upper holding rollers and the lower holding rollers are rotatably supported such that their rotational axes are inclined outward in the TD of the film toward downstream side of the MD of the film, and
wherein when holding areas where the upper holding rollers hold the film in the MD of the film are considered, lengths, intervals, and inclination angles of rotational axes relative to the TD of the film of the upper holding rollers are set such that two adjacent holding areas are in contact with each other or overlap each other as viewed from the TD.

2. The stretching apparatus according to claim 1, further comprising an upper plate supporting the plurality of upper holding rollers and a lower plate placed in opposite to the upper plate to support the plurality of lower holding rollers.

3. The stretching apparatus according to claim 2, wherein at least one of the upper plate and the lower plate is supported to be movable vertically.

4. The stretching apparatus according to claim 2, wherein at least ones of the plurality of upper holding rollers and the plurality of lower holding rollers are supported to be elastically and vertically displaceable individually with a plurality of elastic members interposed between each holding roller and the plate supporting the roller.

5. The stretching apparatus according to claim 1, further comprising a heating furnace heating the film during transfer between the advancing mechanism and the take-in mechanism, wherein at least part of the film holding unit is placed within the heating furnace.

6. The stretching apparatus according to claim 5, wherein the heating furnace has an inlet-side opening and an outlet-side opening for the film, and some of the plurality of upper holding rollers and some of the lower holding rollers are placed outside the heating furnace through the inlet-side opening and the outlet-side opening.

7. The stretching apparatus according to claim 5, wherein the heating furnace heats the film with hot air.

8. The stretching apparatus according to claim 1, wherein each of the upper holding rollers and the lower holding rollers has a circumferential surface subjected to rough-surface treatment.

9. The stretching apparatus according to claim 1, wherein each of the advancing mechanism and the take-in mechanism is a roller.

10. The stretching apparatus according to claim 9, wherein at least one of the advancing mechanism and the take-in mechanism is a suction roller.

11. The stretching apparatus according to claim 3, wherein at least ones of the plurality of upper holding rollers and the plurality of lower holding rollers are supported to be elastically and vertically displaceable individually with a plurality of elastic members interposed between each holding roller and plate supporting the roller.

12. The stretching apparatus according to claim 6, wherein the heating furnace heats the film with hot air.

* * * * *